United States Patent [19]

Kanuma

[11] Patent Number: 5,165,034
[45] Date of Patent: Nov. 17, 1992

[54] LOGIC CIRCUIT INCLUDING INPUT AND OUTPUT REGISTERS WITH DATA BYPASS AND COMPUTATION CIRCUIT WITH DATA PASS

[75] Inventor: Akira Kanuma, Yokohama, Japan

[73] Assignee: Kabushiki Kaisha Toshiba, Kawasaki, Japan

[21] Appl. No.: 776,728

[22] Filed: Oct. 15, 1991

Related U.S. Application Data

[63] Continuation of Ser. No. 626,412, Dec. 14, 1990, abandoned, which is a continuation of Ser. No. 303,987, Jan. 30, 1989, abandoned, which is a continuation of Ser. No. 945,791, Dec. 23, 1986, abandoned.

[30] Foreign Application Priority Data

Dec. 28, 1985 [JP] Japan .................. 60-297011

[51] Int. Cl.⁵ .................................. G06F 7/38
[52] U.S. Cl. .................... 395/775; 364/DIG. 2; 364/926.1; 364/923.6; 364/939; 364/939.1; 364/939.7; 364/921.8; 364/964.21; 364/947; 364/947.7; 364/937.1; 364/937.8
[58] Field of Search ............ 371/22.5, 22.6, 22.1, 371/15.1, 24, 27; 395/775

[56] References Cited

U.S. PATENT DOCUMENTS

| | | | |
|---|---|---|---|
| 3,319,228 | 5/1967 | Apple | 364/900 |
| 3,751,650 | 8/1973 | Koehn | 235/175 |
| 3,771,141 | 11/1973 | Culler | 364/200 |
| 3,919,694 | 11/1975 | Tung | 340/172.5 |
| 4,078,251 | 3/1978 | Hamilton | 364/900 |
| 4,133,028 | 1/1979 | Bernstein | 364/200 |
| 4,344,131 | 8/1982 | Girard | 364/200 |
| 4,435,765 | 3/1984 | Uchida et al. | 364/200 |
| 4,463,441 | 7/1984 | Kassabov et al. | 364/736 |
| 4,467,444 | 8/1984 | Harmon, Jr. et al. | 364/900 |
| 4,528,625 | 7/1985 | McDonough et al. | 364/200 |
| 4,559,608 | 12/1985 | Young et al. | 364/736 |
| 4,685,077 | 8/1987 | Loo | 364/759 |
| 4,785,393 | 11/1988 | Chu et al. | 364/200 |

FOREIGN PATENT DOCUMENTS 0051154 5/1982 European Pat. Off.
60-13266 1/1985 Japan.

OTHER PUBLICATIONS

J. E. Thornton, "Design of a Computer the Control Data 6600", 1970, pp. 60-63, Scott, Foresman and Company, Glenview, US.
Sugai et al., "VLSI Processor for Image Processing", Proceedings of the IEEE, vol. 75, No. 9, Sep. 1987, pp. 1160-1166.
Kanuma et al., "WPM 9.5: A 20 MHz 32b Pipelined CMOS Image Processor", Session IX: Sensors and Interface Electronics, IEEE International Solid-State Circuits Conference, Feb. 1986, pp. 102-103 & 320.

Primary Examiner—Kevin A. Kriess
Attorney, Agent, or Firm—Foley & Lardner

[57] ABSTRACT

A logic circuit comprises an input register for holding data to be computed, a computation circuit for computationally processing the data inputted from the input register to output the computationally processed result, and an output register for holding the computationally processed result outputted from the computation circuit, characterized in that the computation circuit includes computational data pass device for passing input data therethrough as it is without applying computation processing thereto, thus permitting data held in the input register to pass through the computation circuit and be inputted to the output register as it is. By simply varying the control inputs to the register and the computation circuit, it is possible to read data from an arbitrary register or write it thereinto. This easily gives a test without practically increasing an amount of wiring. Random access to each register can be performed without newly providing data bus or selector in a circuit in which registers and arithmetic and logic means are mixedly provided.

9 Claims, 9 Drawing Sheets

F I G. I

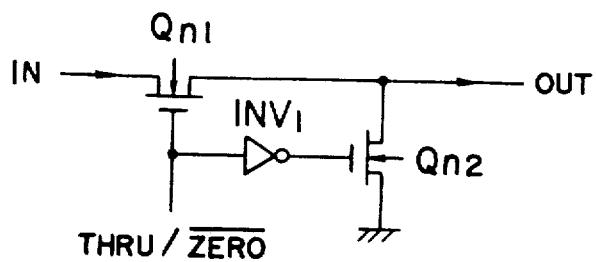
FIG. 3
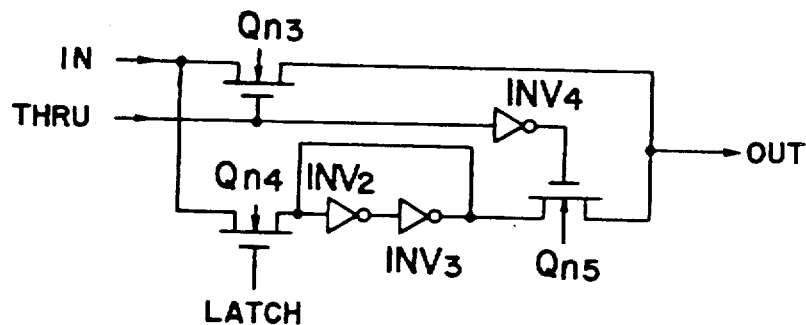
FIG. 4
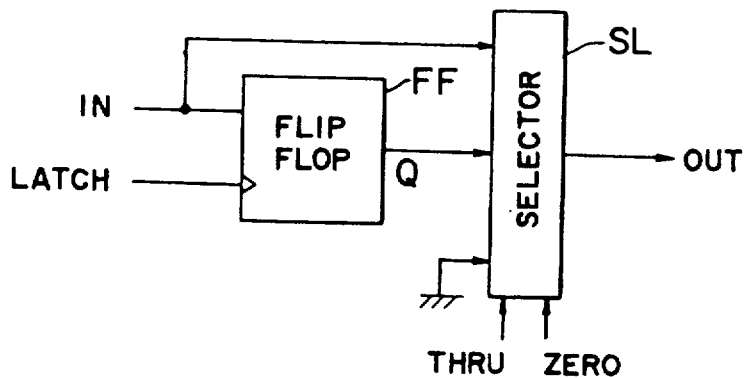
FIG. 6(a)
FIG. 6(b)

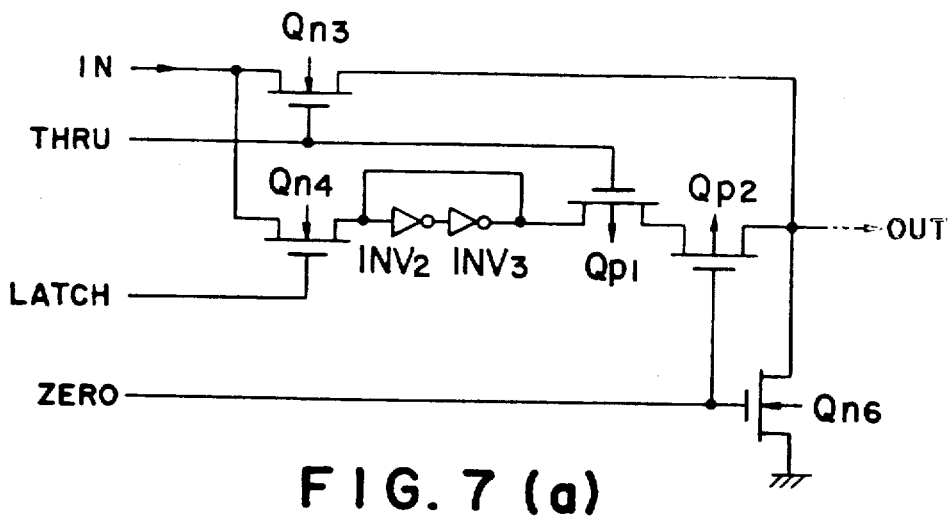
FIG. 7 (a)
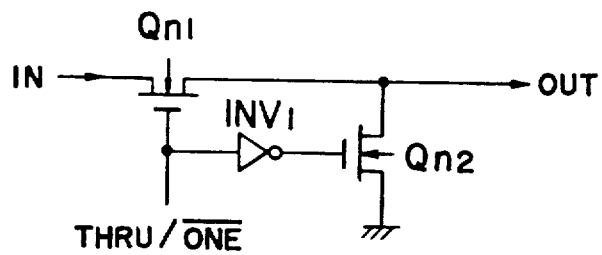
FIG. 7 (b)
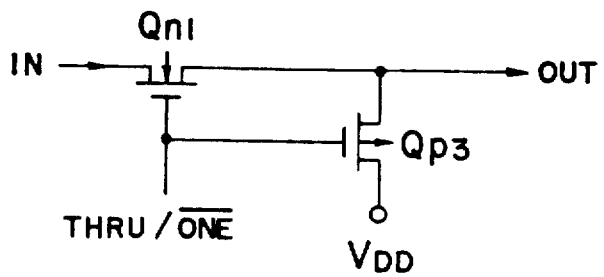
FIG. 9 (a)
FIG. 9 (b)

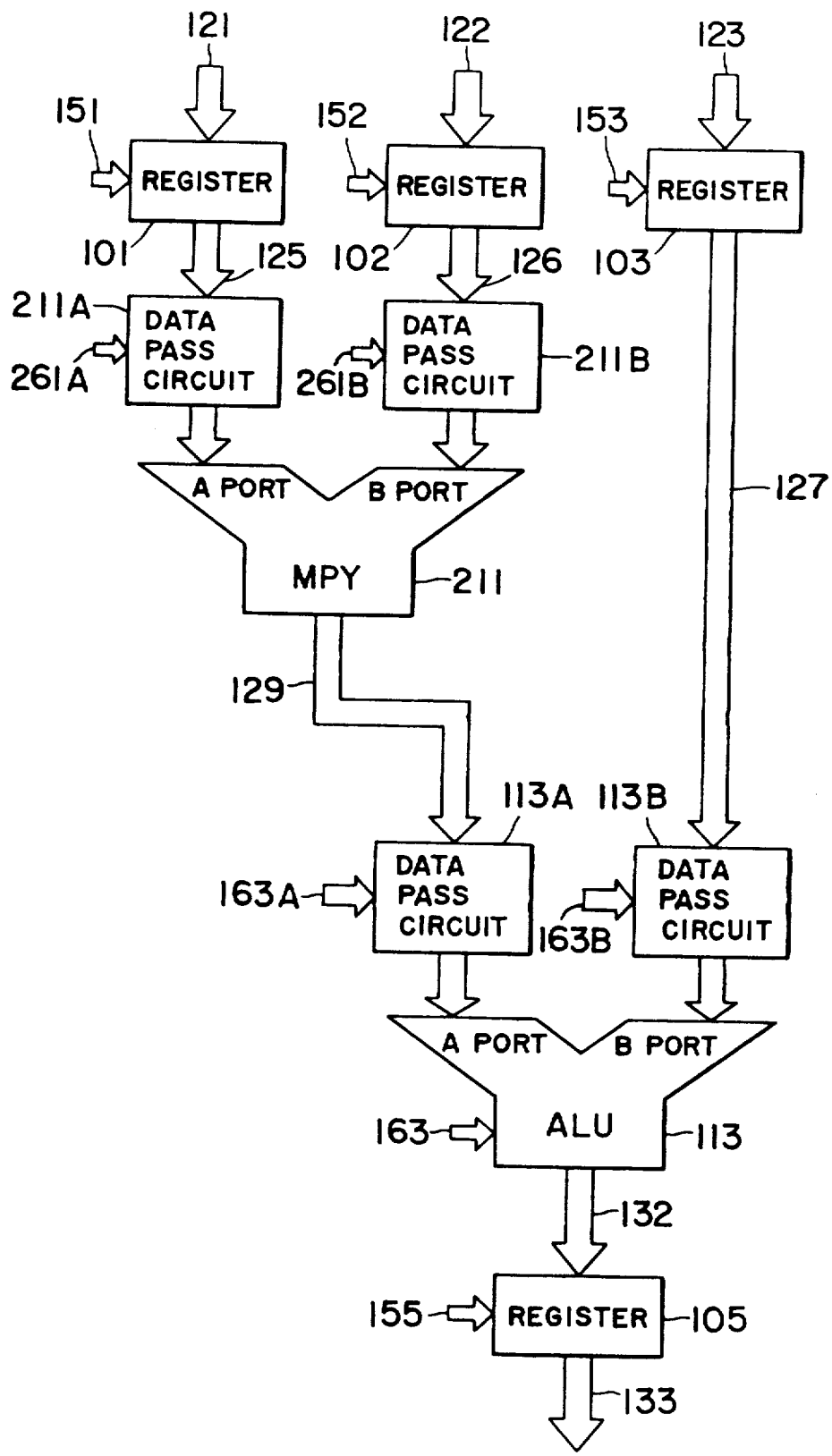
F I G. 8

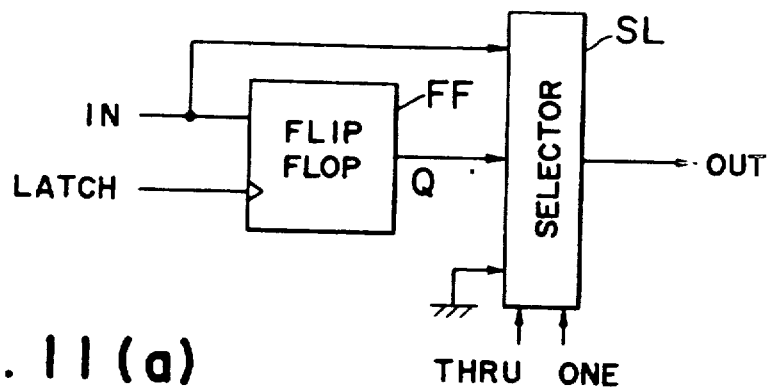
FIG. 11 (a)
FIG. 11 (b)
| THRU | ONE | OUT |
|------|-----|-----|
| 0 | 0 | Q |
| 1 | 0 | IN |
| X | 1 | 0 |
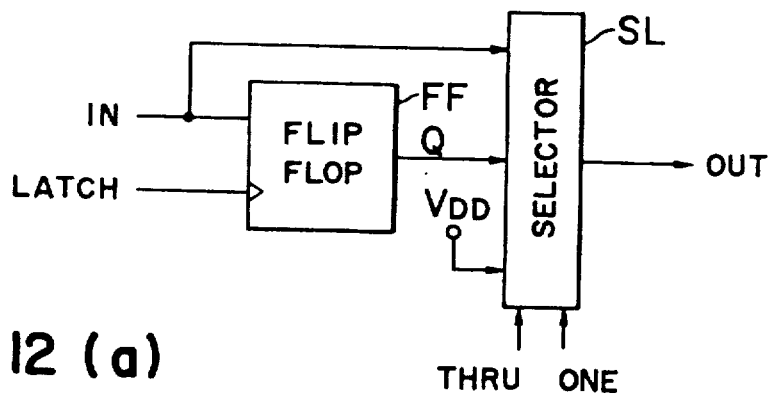
FIG. 12 (a)
FIG. 12 (b)
| THRU | ONE | OUT |
|------|-----|-----|
| 0 | 0 | Q |
| 1 | 0 | IN |
| X | 1 | 1 |

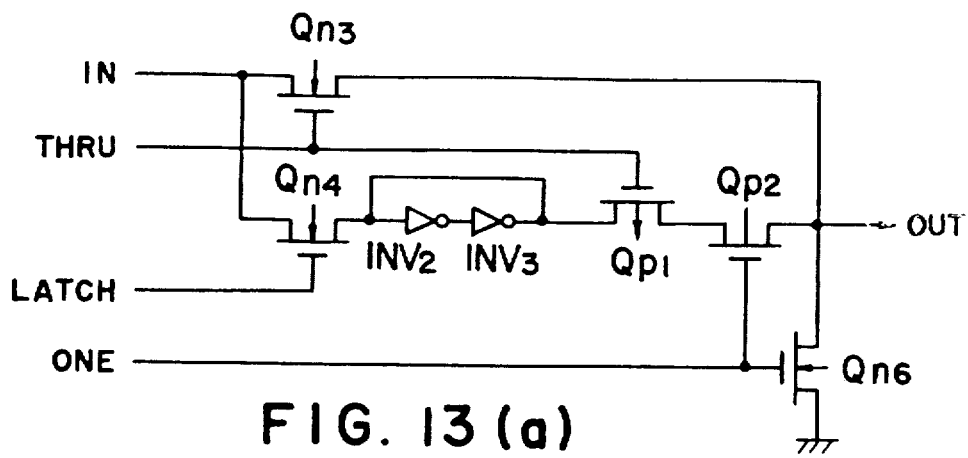
FIG. 13 (a)
FIG. 13 (b)
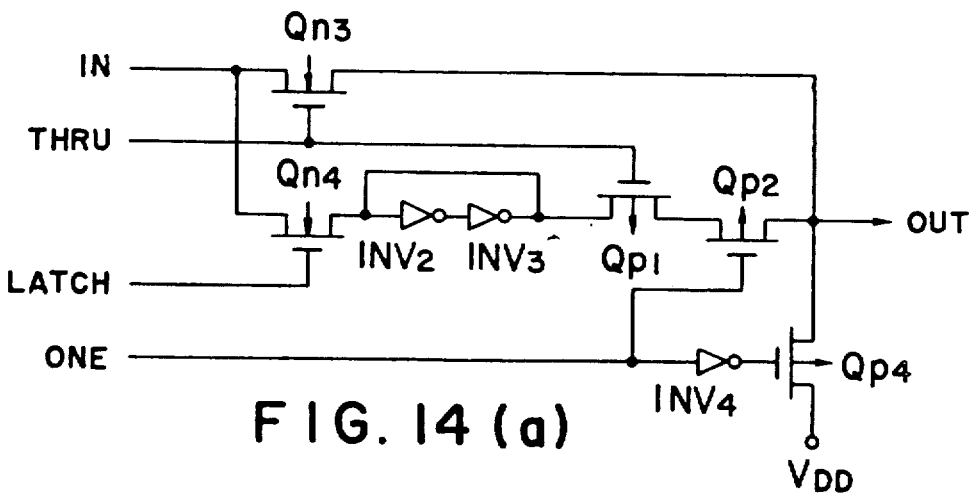
FIG. 14 (a)
FIG. 14 (b)

LOGIC CIRCUIT INCLUDING INPUT AND OUTPUT REGISTERS WITH DATA BYPASS AND COMPUTATION CIRCUIT WITH DATA PASS

This application is a continuation of application Ser. No. 07/626,412, filed Dec. 14, 1990, now abandoned, which is a continuation of application Ser. No. 07/303,987, filed Jan. 30, 1989, now abandoned, which is a continuation of application Ser. No. 06/945,791, filed Dec. 23, 1986, now abandoned.

BACKGROUND OF THE INVENTION

The present invention relates to a logic circuit at least comprising registers including input and output registers and a computation circuit for computationally processing data.

Accordingly as the degree of integration of semiconductor integrated circuits is improved and the complexity of logical circuits is increased, a data transfer function to write data into a memory circuit therein or read it therefrom becomes indispensable. Such a function is especially significant for i) initialization of data, ii) reading computed results, iii) logical function test at the times of development of integrated circuits and forwarding and receiving of products, and iv) program development of integrated circuits.

In the logical function test, the first operation is to write initialization data into a register in the logic circuit to operate the logic circuit thereafter to read the content of the register. Accordingly, it is necessary to write data into a register in the logic circuit or read it therefrom.

An actual example of a conventional logic circuit is shown in FIG. 1. Registers 1, 2, 3 and 4 hold data to be computed. These registers 1, 2, 3 and 4 are controlled by control inputs 51, 52, 53 and 54, respectively. The registers 1 and 2 are connected to input terminals of an ALU (Arithmetic and Logic Unit) 11 serving as a computation circuit. Likewise, the registers 3 and 4 are connected to input terminals of an ALU 12. These ALUs 11 and 12 are controlled by control inputs 61 and 62, respectively. The result which has been computationally processed by the ALU 12 is shifted by a barrel shifter 14 controlled by a control input 64 and then is inputted to an ALU 13. The result which has been computationally processed by the ALU 11 is inputted to the ALU 13 as it is, which is controlled by a control input 63. The result which has been computationally processed by the ALU 13 is held by a register 5 controlled by a control input 55.

In addition, a selector 21 is provided for reading the contents of these registers 1 to 5. Namely, the selector 21 selects one of outputs from the registers 1 to 5 on the basis of a control input 71 to output a selected one to the external. Thus, the contents of the registers 1 to 5 can be read according to need.

However, the drawbacks with such a conventional logic circuit are that it is required to provide a selector for the purpose of reading the contents of registers, and that wiring a large number of signal lines with them being drawn around must be implemented for the purpose of connecting respective registers to the selector. This results in an increase in the area of the semiconductor chip, an increase in delay time due to wiring, and an increase in operating power dissipation due to stray capacitance of the wiring. Another drawback with this conventional logic circuit is that it is unable to directly write a desired data into the register, with the result that a further additional circuit is required in order to write data thereinto.

SUMMARY OF THE INVENTION

An object of the present invention is to provide a logic circuit which can read data out of internal registers or write it thereinto without increasing an amount of wiring.

The above-mentioned object is realized by a logic circuit comprising an input register for holding data to be computed, a computation circuit for computationally processing the data inputted from the input register to output the computationally processed result, and an output register for holding the computationally processed result outputted from the computation circuit, characterized in that the computation circuit includes computational data pass means for passing input data therethrough as it is without applying computation processing thereto, thus permitting data held in the input register to pass through the computation circuit and be inputted to the output register as it is.

BRIEF DESCRIPTION OF THE DRAWINGS

In the accompanying drawings:

FIG. 3 is a circuit diagram illustrating an actual example of a data pass circuit of an ALU provided in the logic circuit shown in FIG. 2;

FIG. 4 is a circuit diagram illustrating a register provided in the logic circuit shown in FIG. 2;

FIGS. 6(a) and 6(b) are a circuit diagram of a circuit constituting a register provided in the logic circuit shown in FIG. 5 and a truth Table for the selector shown in FIG. 6(a), respectively;

FIGS. 7(a) and 7(b) are a circuit diagram illustrating an actual example of the register shown in FIG. 6(a) and a truth Table therefor, respectively;

FIG. 8 is a block diagram illustrating a further embodiment of a logic circuit according to the present invention;

FIGS. 9(a) and 9(b) are circuit diagrams illustrating an actual example of a data pass circuit of an ALU provided in the logic circuit shown in FIG. 8, in connection with bits except for zero bit and the zero bit, respectively;

FIGS. 11(a) and 11(b) are a block diagram showing an example of a circuit constituting bits except for zero bit of a register provided in the logic circuit shown in FIG. 10 and a truth Table therefor, respectively;

FIGS. 12(a) and 12(b) are a block diagram showing an example of a circuit constituting the zero bit of a register provided in the logic circuit shown in FIG. 10 and a truth Table therefor, respectively; and FIGS. 13(a), 13(b), 14(a) and 14(b) are circuit diagrams illustrating actual examples of the circuits shown in FIGS. 11(a) and 12(a), respectively and truth Tables therefor, respectively.

DETAILED DESCRIPTION OF THE INVENTION

Figure 1:
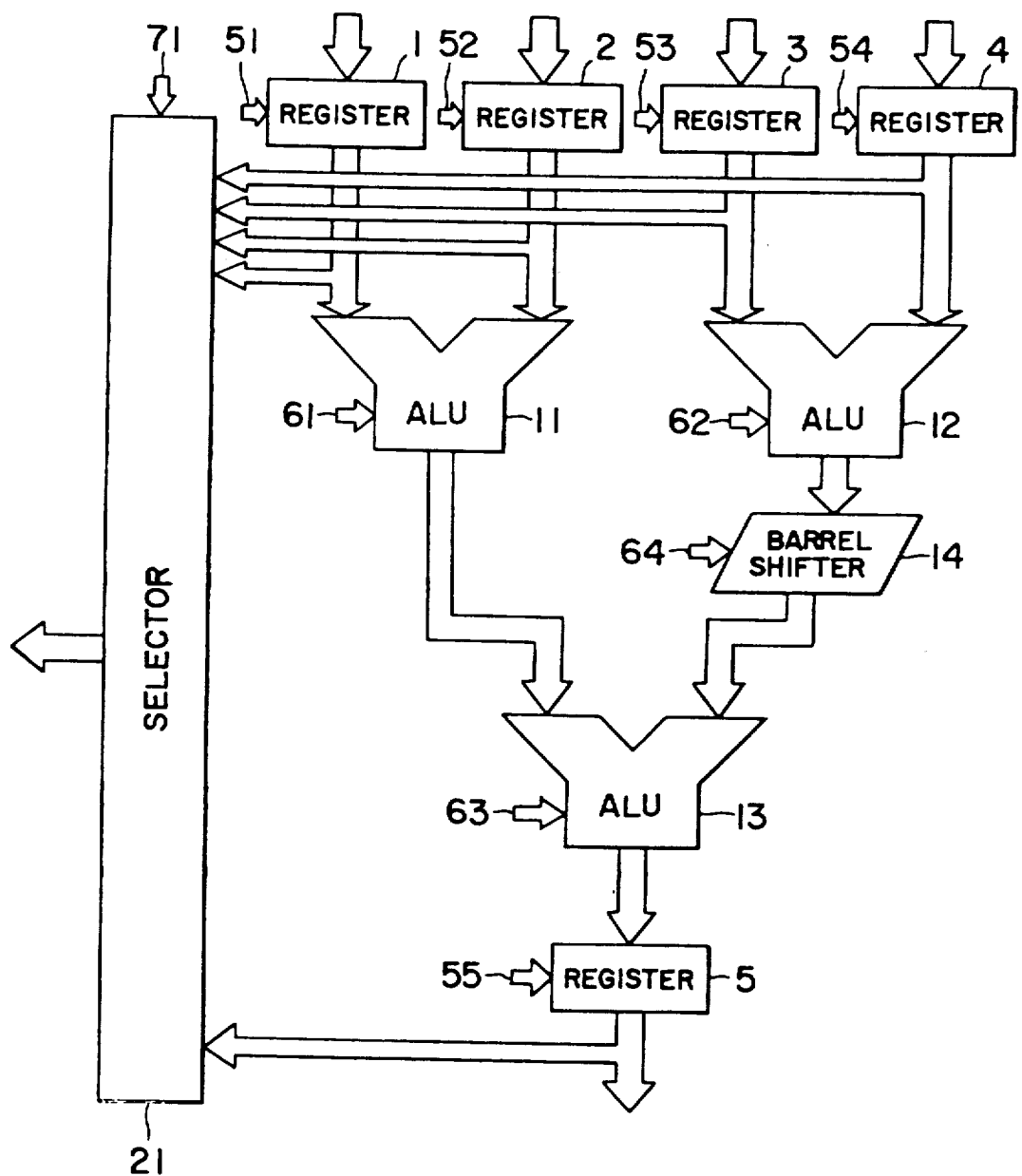
FIG. 1 is a block diagram illustrating a conventional logic circuit.
Figure 2:
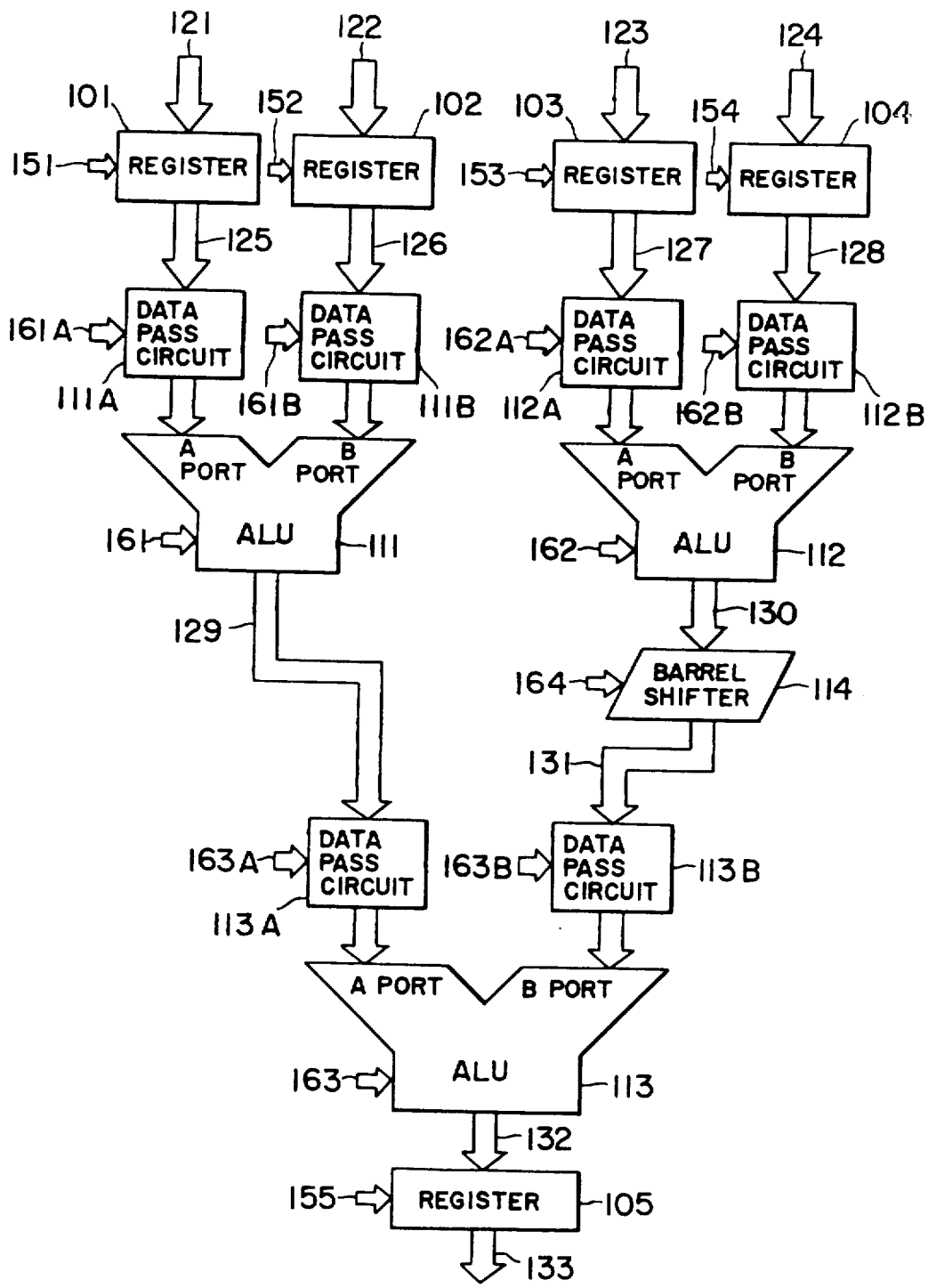
FIG. 2 is a block diagram illustrating an embodiment of a logic circuit according to the present invention.

An embodiment of a logic circuit according to the present invention is shown in FIG. 2. Registers 101 to 104 hold input data from data buses 121 to 124 to output them to data buses 125 to 128, respectively. These registers 101 to 104 perform various functions as described later by control inputs 151 to 154, respectively. Data from registers 101 and 102 are inputted respectively through data buses 125 and 126 to an ALU 111. The ALU 111 is provided at respective A and B ports with data pass circuits 111A and 111B. A control input 161 is inputted to the ALU 111 and control inputs 161A and 161B are inputted to data pass circuits 111A and 111B, respectively. The functions of the ALU 111 and the data pass circuits 111A and 111B will be described later. Likewise, data from registers 103 and 104 are inputted respectively through data buses 127 and 128 to an ALU 112. The ALU 112 is provided at respective A and B ports with data pass circuits 112A and 112B. To the ALU 112, and data pass circuits 112A and 112B, control inputs 162, 162A and 162B are inputted, respectively.

The output of the ALU 111 is inputted to an A port of an ALU 113 through a data bus 129. The output of the ALU 112 is inputted to a barrel shifter 114 through a data bus 130. The barrel shifter 114 shifts the data thus inputted in accordance with a control input 164 to output the data shifted to a data bus 131. The output of the barrel shifter 114 is inputted to a B port of the ALU 113 through the data bus 131.

The ALU 113 is provided at respective A and B ports with data pass circuits 113A and 113B. To the ALU 113 and the data pass circuits 113A and 113B, control inputs 163, 163A and 163B are inputted, respectively. The output of the ALU 113 is inputted to a register 105 through a data bus 132. The register 105 performs various functions by a control input 155. The output data held in the register 105 is outputted to a data bus 133.

Each of the data pass circuits 111A and 111B, 112A and 112B, and 113A and 113B, respectively provided at the ALU 111, 112 and 113, is constituted with a circuit as shown in FIG. 3 per each bit. Namely, between input and output terminals IN and OUT, an n-channel MOS transistor $Q_{n1}$ is inserted. Its gate is connected to a control input terminal THRU/$\overline{ZERO}$. Between the output terminal OUT and ground, an n-channel MOS transistor $Q_{n2}$ is inserted. The gate of this transistor $Q_{n2}$ is connected to the control input terminal THRU/$\overline{ZERO}$ through an inverter $INV_1$.

When the control input terminal THRU/$\overline{ZERO}$ represents H level, the transistor $Q_{n1}$ is turned on and the transistor $Q_{n2}$ is cut off. Accordingly, a signal input to the input terminal IN passes through the circuit as it is and the signal which has passed therethrough is outputted to the output terminal OUT. In contrast, when the control input terminal THRU/$\overline{ZERO}$ represents L level, the transistor $Q_{n1}$ is cut off and the transistor $Q_{n2}$ is turned on. Accordingly, even when any signal is inputted to the input terminal IN, a signal of logical "0" is outputted from the output terminal OUT.

Each of the registers 101 to 105 is configured with a circuit as shown in FIG. 4 per each bit. Between input and output terminals IN and OUT, an n-channel transistor $Q_{n3}$ is inserted. The gate of the transistor $Q_{n3}$ is connected to a control input THRU. The input terminal IN is connected to series-connected inverters $INV_2$ and $INV_3$ for holding data through an n-channel MOS transistor $Q_{n4}$. These inverters $INV_2$ and $INV_3$ are connected to the output terminal OUT through an n-channel MOS transistor $Q_{n5}$. The gate of the transistor $Q_{n4}$ is connected to a control input terminal LATCH. The gate of the transistor $Q_{n5}$ is connected to the control input terminal THRU through an inverter $INV_4$.

In the case of latching data inputted from the input terminal IN, it is sufficient to hold the control input terminal LATCH at H level. When the control input terminal THRU represents H level, the transistor $Q_{n3}$ is turned on and the transistor $Q_{n5}$ is cut off. Accordingly, a signal input to the input terminal IN is outputted from the output terminal OUT as it is. In contrast, when the control input THRU represents L level, the transistor $Q_{n3}$ is cut off and the transistor $Q_{n5}$ is turned on. Accordingly, data held by the inverters $INV_2$ and $INV_3$ is outputted from the output terminal OUT.

In the embodiment in FIG. 2, outputs from a desired number of computation circuits or registers which are not shown in this figure may be inputted via respective data buses 121 to 124, and similarly an output from the data bus 133 may be inputted to a desired number of computation circuits or registers which are not shown in this figure. In addition, such computation circuits and registers can be configured in the same manner as in the present invention. For instance, n-stages of circuits shown in FIG. 2 may be connected in series to constitute a logic circuit.

The operation of this embodiment will be now described.

First, the operation of the usual computational mode will be described. In the computational mode, settings are made such that a signal on each THRU of the control inputs 151 to 155 of the registers 101 to 105 represents L level and a signal on each THRU/$\overline{ZERO}$ of the control inputs 161A, 161B, 162A, 162B, 163A and 163B for the data pass circuits 111A, 111B, 112A, 112B, 113A and 113B, respectively provided in the ALUs 111 to 113, represents H level. Thus, data which have been held in the registers 101 to 104 are outputted therefrom. As a result, data inputted to the data pass circuits 111A, 111B, 112A, 112B, 113A and 113B are inputted to respective ports of the ALUs 111, 112 and 113 as they are.

Data inputted to the data buses 121 to 124 are latched in the registers 101 to 104, respectively. Data latched in the registers 101 and 102 are inputted to the data buses 125 and 126, respectively. The data pass circuits 111A and 111B allow data thus inputted to pass therethrough as they are to input them to the A and B ports, respectively. The ALU 111 performs processing, e.g., addition, subtraction, logical product and logical sum etc. to output the computationally processed result to the data bus 129. Likewise, data latched in the registers 103 and 104 are inputted to the A and B ports of the ALU 112 via the data buses 127 and 128 and the data pass circuits 112A and 112B, respectively. The computationally processed result in the ALU 112 is outputted to the data bus 130. The barrel shifter 114 shifts the data from the data bus 130 on the basis of the value of the control input 164 to output its result to the data bus 131.

The data on the data buses 129 and 131 are inputted to the A and B ports of the ALU 113 via the data pass circuits 113A and 113B, respectively. The ALU 113 performs operation processing designated by the control input 163 to output its result to the data bus 132. The register 155 latches data from the data bus 132 to the data thus latched to the data bus 133.

As just described above, data inputted to the data buses 121 to 124 are subjected to computational processing and the computationally processed data is outputted from the data bus 133.

Then, the operation of the data transfer mode will be described. Explanation will be made, e.g., in connection with the case of writing data inputted from the data bus 121 into the register 105. A setting is made such that a signal on THRU of the control input 151 for the register 101 represents H level, thus outputting data inputted from the data bus 121 to the data bus 125 as it is. A setting is made such that a signal on THRU/$\overline{\text{ZERO}}$ of the control input 161A for the data pass circuit 111A provided in association with the ALU 111 represents H level, thus inputting data from the data bus 125 to the A port as it is. On the other hand, a setting is made such that a signal on THRU/$\overline{\text{ZERO}}$ of the control input 161B for the data pass circuit 111B provided in association with the ALU 111 represents an L level, thus inputting data of logical "0" to the B port. When addition is designated to the ALU 111 by the control input 161, data from the data bus 125 is outputted to the data bus 129. When settings are made such that a signal on THRU/$\overline{\text{ZERO}}$ of the control input 163A for the data pass circuit 113A provided in association with the ALU 113 represents H level and a signal on THRU/$\overline{\text{ZERO}}$ of the control input 163B for the data pass circuit 113B provided in association therewith represents L level, and when addition is designated to the ALU 113 by the control input 163, data on the data bus 129 is outputted to the data bus 132 as it is. When a setting is made such that a signal on LATCH of the control input 155 for the register 105 represents H level, data from the data bus 132 is written into the register 105. After all, data inputted via the data bus 121 passes through the register 101 and the ALUs 111 and 113 and is written into the register 105.

The operation of another example of the data transfer mode will be now described. Explanation will be made in connection with the case of reading data held in the register 103 to the data bus 133. When settings are made such that a signal on THRU/$\overline{\text{ZERO}}$ the control input 162A for the data pass circuit 112A provided in association with the ALU 112 represents H level, and a signal on THRU/$\overline{\text{ZERO}}$ of the control input 162B for the data pass circuit 112B provided in association therewith represents L level, and when addition is designated to the ALU 112 by the control input 162, data on the data bus 127 outputted from the register 103 is outputted to the data bus 130 as it is. By designating 0 bit shift to the barrel shifter 114 by the control input 164, data on the data bus 130 is outputted onto the data bus 131 as it is. When settings are made such that a signal on THRU/$\overline{\text{ZERO}}$ of the control input 163A for the data pass circuit 113A provided in association with the ALU 113 represents L level, and a signal on THRU/$\overline{\text{ZERO}}$ of the control input 103B for the data pass circuit 113B provided in association with the ALU 113 represents H level, and when addition is designated to the ALU 113 by the control input 163, data on the data bus 131 is outputted to the data bus 132 as it is. When a setting is made such that a signal on THRU of the control input 155 for the register 105 represents H level, data on the data bus 132 is outputted to the data as it is. After all, data held in the register 103 passes through the ALU 112, the barrel shifter 114, the ALU 113 and the register 105 and then is outputted to the data bus 133.

As just described above, in accordance with this embodiment, by simply varying the control inputs to the register and the ALU, it is possible to read data from an arbitrary register or write it thereinto. This easily gives a test without practically increasing an amount of wiring. Namely, random access to each register can be performed without newly providing data bus or selector in a circuit in which registers and arithmetic and logic means are mixedly provided.

Figure 5:
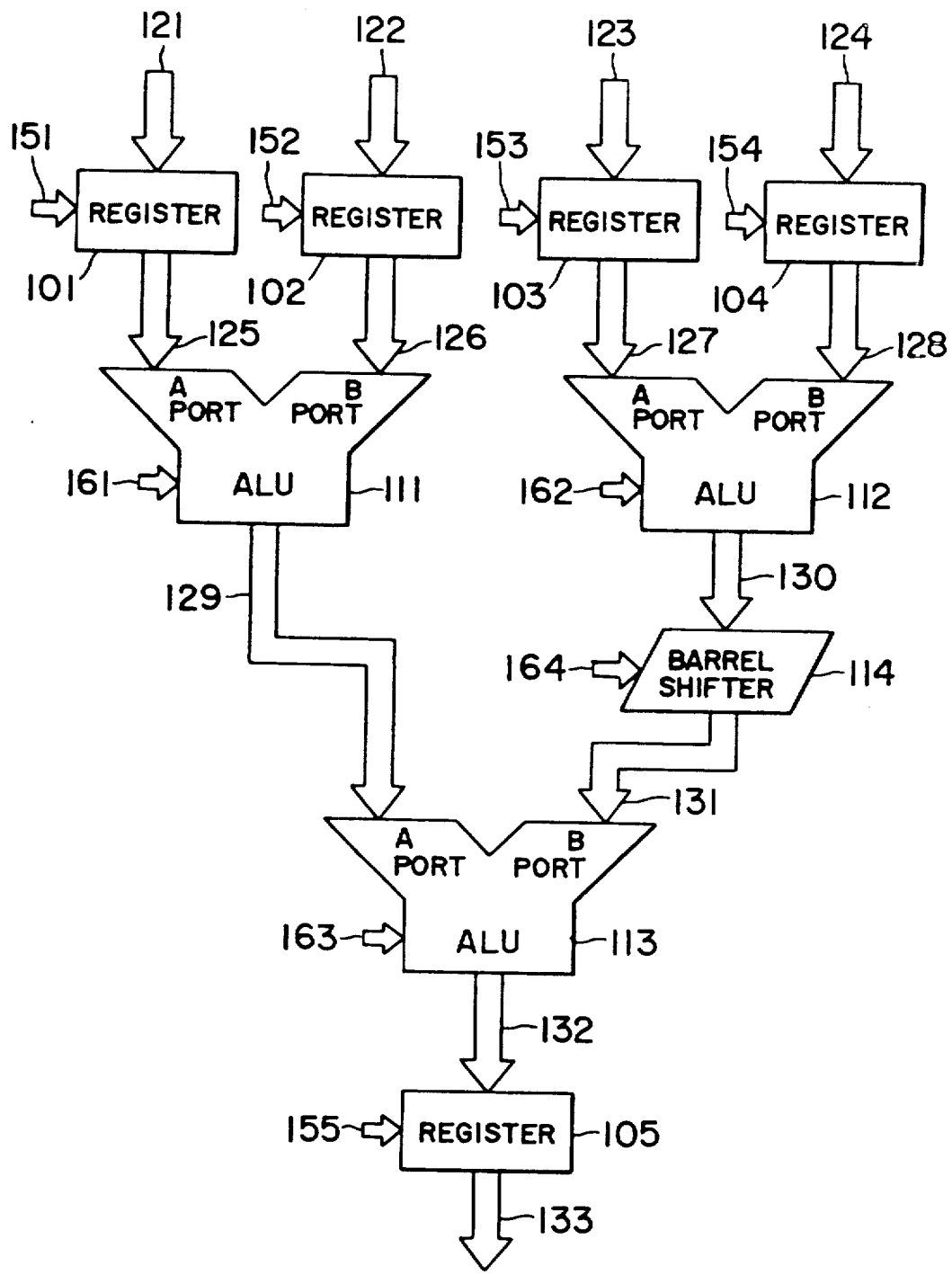
FIG. 5 is a block diagram illustrating another embodiment of a logic circuit according to the present invention.

Another embodiment of a logic circuit according to the present invention will be described with reference to FIGS. 5 and 6. The logic circuit according to this embodiment is characterized in that each of the registers 101 to 105 is constituted with a circuit as shown in FIG. 6 without providing data pass circuits at the respective ALUs 111, 112 and 113. This circuit is composed of a flip-flop FF and a selector SL. The flip-flop FF latches data inputted to the input terminal on the basis of a signal appearing on a control input LATCH. The selector SL is supplied with a signal appearing on the input terminal IN, an output Q of the flip-flop FF and a signal of ground (L) level to select one from them on the basis of signals on the control input terminals THRU and ZERO to output a selected one from the output terminal OUT. The truth Table for the selector SL is shown in FIG. 6(b). When the control inputs THRU and ZERO both represent logical "0", latched data Q is outputted from the output terminal OUT. When the control inputs THRU and ZERO represent logical "1" and "0", respectively, a signal IN inputted to the input terminal IN is outputted from the output terminal OUT as it is. When the control input ZERO shifts to logical "1", a signal of logical "0" is always outputted from the output terminal OUT.

The operation of the above-described circuit will be now described.

In the ordinary computational mode, it is sufficient that settings are made such that signals on THRU and ZERO of the control inputs 151 to 155 for the registers 101 to 105 both represent logical "0", thus outputting data Q held in the flip-flop FF from the output terminal OUT.

Then, the operation of the data transfer mode will be described. For instance, in the case of writing data inputted to the data bus 121 into the register 105, its operation will be performed as follows. Settings are made such that signals on the control inputs THRU and ZERO of the register 101 represent logical "1" and "0", respectively, signals on the control inputs ZERO of the registers 102, 103 and 104 represent logical "1", a signal on the control input LATCH of the register 105 represents logical "1". Addition is instructed to the ALUs 111 and 112 through control inputs 161 and 162, respectively. A zero bit shift is instructed to the barrel shifter 114 through the control input 164. Thus, data on the data bus 121 is outputted from the register 101 to the data bus 125 as it is. In addition, from the registers 102, 103 and 104, data of logical "0" are outputted to data buses 126, 127 and 128, respectively. Accordingly, data on the data bus 125 is outputted from the ALU 111 to a data bus 129. From the ALU 112 and the barrel shifter 114, data of logical "0" is outputted. For this reason, data on the data bus 129 is outputted from the ALU 113 to the data bus 132. The data thus outputted is latched by the register 105. After all, data inputted to the data bus 121 is written into the register 105 via the register 101 and the ALUs 111 and 113. In connection with other cases, by varying control inputs for respective registers, it is possible to read the content of a certain register or write data into a certain register.

An actual example of FIG. 6 circuit is shown in FIG. 7. Instead of the inverter $INV_4$ and the n-channel MOS transistor $Q_{n5}$ provided in the circuit shown in FIG. 4, a p-channel MOS transistor $Q_{p1}$ of which gate is connected to the control input THRU and a p-channel MOS transistor $Q_{p2}$ of which gate is connected to the control input terminal ZERO are inserted. In addition, between the output terminal OUT and ground, an n-channel MOS transistor $Q_{n6}$ is inserted and its gate is connected to the control input terminal ZERO.

When signals appearing on the control input terminals THRU and ZERO both represent L level, the transistors $Q_{n3}$ and $Q_{n6}$ are cut off and the transistors $Q_{p1}$ and $Q_{p2}$ are turned on. Thus, an output Q of the flip-flop constituted With the inverters $INV_2$ and $INV_3$ is outputted from the output terminal OUT. When signals appearing on the control input terminals THRU and ZERO represent H and L levels, respectively, the transistors $Q_{n3}$ and $Q_{p2}$ are turned on and the transistors $Q_{p1}$ and $Q_{n6}$ are cut off. Thus, a signal appearing on the input terminal IN is outputted from the output terminal OUT as it is. When signals appearing on the control input terminals THRU and ZERO represent L and H levels, respectively, the transistors $Q_{n3}$ and $Q_{p2}$ are cut off and the transistors $Q_{p1}$ and $P_{n6}$ are turned on. Thus, a signal of logical "0" is outputted from the output terminal OUT. In addition, when signals appearing on the control input terminals THRU and ZERO both represent H level, an output of signal is disabled.

A further embodiment of a logic circuit according to the present invention is shown in FIG. 8. Registers 101, 102 and 103 hold input data from the data buses 121, 122 and 123 to output them to data buses 125, 126 and 127, respectively. The registers 101, 102 and 103 perform various functions as described later in accordance with control inputs 151, 152 and 153, respectively. Data from the registers 101 and 102 are inputted to an MPY 211 respectively via the data buses 125 and 126. The MPY 211 is a multiplier to perform multiplication of data inputted to A and B ports to output a multiplied result. The MPY 211 is provided at respective A and B ports with data pass circuits 211A and 211B. To the data pass circuits 211A and 211B, control inputs 261A and 261B are inputted, respectively. The functions of the MPY 211 and the data pass circuits 211A and 211B will be described later.

The output of the MPY 211 is inputted to A port of ALU 113 by way of data bus 129. To B port of the ALU 113, data from the register 103 is inputted through the data bus 127.

The ALU 113 is provided at A and B ports with data pass circuits 113A and 113B, respectively. To the ALU 113, the data pass circuits 113A and 113B, control inputs 163, 163A and 163B are inputted, respectively. The output of the ALU 113 is inputted to register 105 through data bus 132. The register 105 performs various functions in accordance with control input 155. The output data held in the register 105 is outputted to the data bus 133.

Each of the data pass circuits 113A and 113B provided in association with the ALU 113 is constituted with the circuit shown in FIG. 3 per each bit in the same manner as in the above-mentioned embodiment.

Each of the registers 101, 102, 103 and 105 is constituted with the circuit shown in FIG. 4 per each bit in the same manner as in the above-mentioned embodiment.

Each of the data pass circuits 211A and 211B provided in association with the MPY 211 is constituted with a circuit as shown in FIG. 9(a) in connection with bits except for zero bit and with a circuit as shown in FIG. 9(b) in connection with zero bit. The circuit shown in FIG. 9(a) has an arrangement nearly identical to the circuit shown in FIG. 3. The former differs from the latter only in that input terminal THRU/$\overline{ONE}$ is connected to the gate of the n-channel transistor $Q_{n1}$.

In the circuit shown in FIG. 9(b), n-channel MOS transistor $Q_{n1}$ is inserted between the input and output terminals IN and OUT and its gate is connected to the control input terminal THRU/$\overline{ONE}$. In addition, p-channel MOS transistor $Q_{p3}$ is inserted between the output terminal OUT and a power supply $V_{DD}$ and the gate of the transistor $Q_{p3}$ is connected to the control input terminal THRU/$\overline{ONE}$.

When the control input terminal THRU/$\overline{ONE}$ represents H level, the transistor $Q_{n1}$ is turned on and the transistor $Q_{p3}$ is cut off. Accordingly, a signal inputted to the input terminal IN passes through the data pass circuit as it is and is outputted from the output terminal OUT. In contrast, when the control input terminal THRU/$\overline{ONE}$ represents L level, the transistor $Q_{n1}$ is cut off and the transistor $Q_{p3}$ is turned on. Accordingly, even when any signal is inputted to the input terminal IN, a signal of logical "1" is outputted from the output terminal OUT.

In the embodiment in FIG. 8, outputs from a desired number of computational circuits or registers which are not shown in this figure may be inputted via respective data buses 121 to 123, and similarly an output from the data bus 133 may be inputted to a desired number of computational circuits or registers which are not shown in this figure. In this instance, such computational circuits or registers may be configured in the same manner as in the present invention.

The operation of this embodiment will be now described.

First, explanation will be made in connection with the ordinary computational mode. In the computational mode, settings are made such that a signal on each THRU of the registers 101, 102, 103 and 105 represents L level, a signal on each THRU/$\overline{ONE}$ of the control inputs 261A and 261B of the data pass circuits 211A and 211B provided in association with the MPY 211 represents H level, and a signal on each THRU/$\overline{ZERO}$ of the control inputs 163A and 163B of the data pass circuits 113A and 113B provided in association with the ALU 113 represents H level. Thus, data held in the registers 101 to 103 are outputted therefrom, respectively. As a result, data inputted to the data pass circuits 211A and 211B are inputted to respective ports of the MPY 211 as they are. Likewise, data inputted to the data pass circuits 113A and 113B are inputted to respective ports of the ALU 113 as they are.

Data inputted to the data buses 121 to 123 are latched in the registers 101 to 103, respectively. The data thus latched in the registers 101 and 102 are inputted to the data pass circuits 211A and 211B by way of data buses 125 and 126, respectively. These data pass circuits 211A and 211B allow the data thus inputted to pass therethrough as they are to input them to the A and B ports, respectively. The MPY 211 performs multiplication processing to output a result obtained based on the computational processing to the data bus 129.

Data on the data buses 129 and 127 are inputted to the A and B ports of the ALU via the data pass circuits 113A and 113B, respectively. The ALU 113 performs computational processing designated by the control input 163 to output its result to the data bus 132. The register 155 latches data from the data bus 132 to the data thus latched to the data bus 133.

As just described above, data inputted to the data buses 121 to 123 are subjected to computational processing and the computationally processed data are outputted from the data bus 133.

Then, the operation of the data transfer mode will be described. Explanation will be made, e.g., in connection with the case of writing data inputted to the data bus 121 into the register 105. A setting is made such that a signal on THRU of the control input 151 for the register 101 represents H level, thus outputting data inputted to the data bus 121 to the data bus 125 as it is. A setting is made such that a signal appearing on THRU/$\overline{ONE}$ of the control input 261A for the data pass circuit 211A provided in association with the MPY 211 represents H level, thus inputting data from the data bus 125 to the A port as it is. On the other hand, a setting is made such that a signal appearing on THRU/$\overline{ONE}$ of the control input 261B for the data pass circuit 211B provided in association with the MPY 211 represents L level, thus inputting data of logical "1" to the B port. Thus, the MPY 211 outputs the data from the data bus 125 to the data bus 129. Settings are made such that a signal appearing on THRU/$\overline{ZERO}$ of the control input 163A for the data pass circuit 113A provided in association with the ALU 113 represents H level, and a signal appearing on THRU/$\overline{ZERO}$ of the control input 163B for the data pass circuit 113B provided in association therewith, and addition is designated to the ALU 113 by the control input 163. Thus, data on the data bus 129 is outputted to the data bus 132 as it is. When a setting is made such that a signal appearing on LATCH of the control input 155 represents H level, data on the data bus 132 is written into the register 105. After all, data which has been inputted to the data bus 121 passes through the register 101, the MPY 211 and the ALU 113 and then is written into the register 105.

Figure 10:
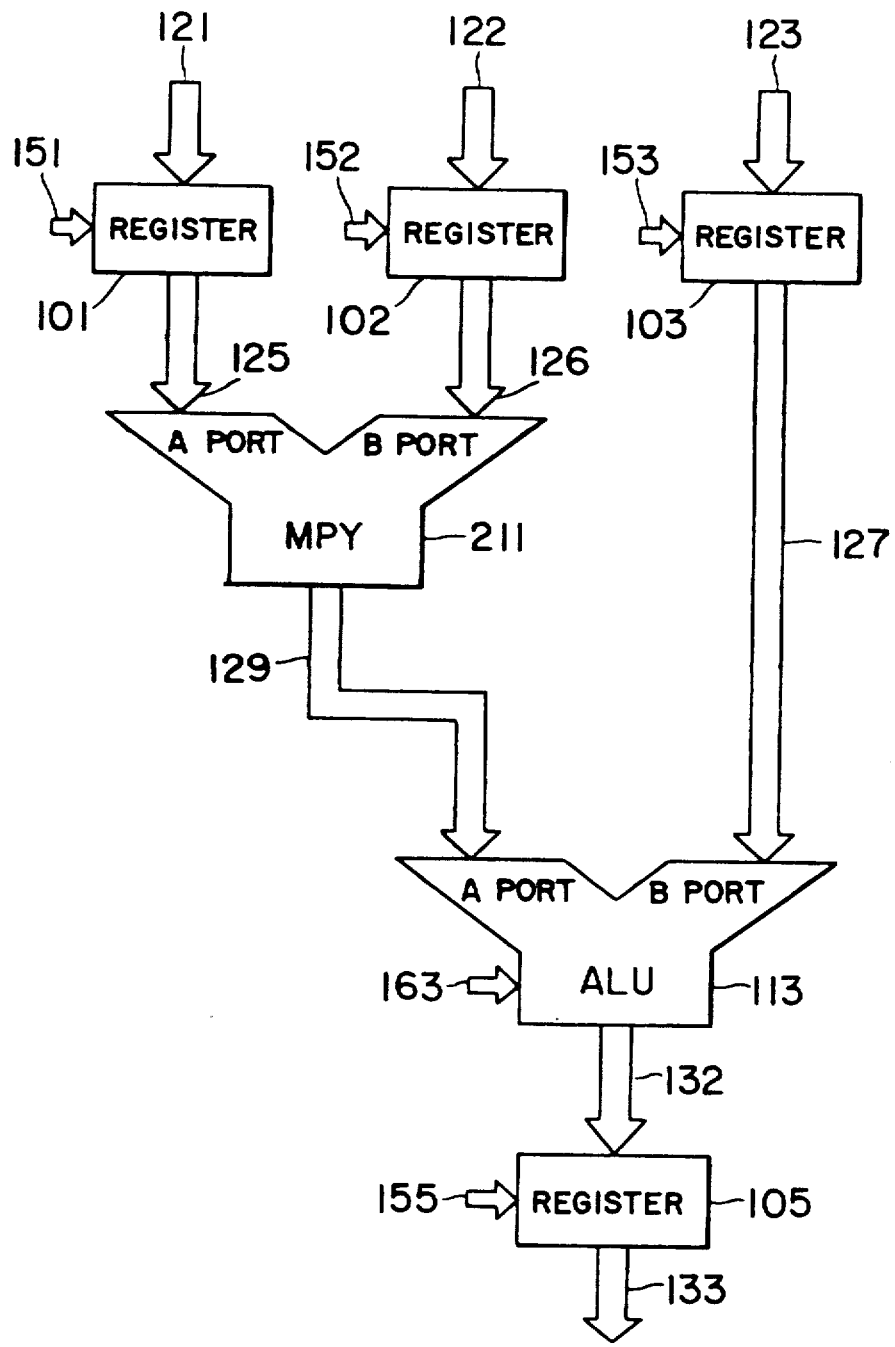
FIG. 10 is a block diagram illustrating a still further embodiment of a logic circuit according to the present invention.

A still further embodiment of a logic circuit according to the present invention will be now described with reference to FIGS. 10 to 12. The logic circuit according to this embodiment is characterized in that each of registers 101 and 102 is constituted with a circuit as shown in FIG. 11 or 12 without providing MPY 211 and ALU 113 and each of registers 103 and 105 is constituted with the circuit as shown in FIG. 6 in the same manner as in the above-mentioned embodiment.

Each of the registers 101 and 102 is constituted with a circuit as shown in FIG. 11(a) in connection with bits except for zero bit (LSB) and with a circuit as shown in FIG. 12(a) in connection with zero bit.

The circuit shown in FIG. 11(a) has the same configuration as the circuit shown in FIG. 6(a). The former differs from the latter only in that a control input terminal labeled ONE is used instead of the control input terminal labeled ZERO. The truth Table for the selector SL is shown in FIG. 11(b) similarly to that in FIG. 6(b).

The circuit shown in FIG. 12(a) is composed of a flip-flop FF and a selector SL similarly to the circuit shown in FIG. 6(a). The flip-flop FF latches data input to the input terminal IN by a signal appearing on the control input terminal LATCH. The selector SL is supplied with a signal appearing on the input terminal IN, an output Q of the flip-flop FF, and a signal of H level ($V_{DD}$) to select one from them by signals appearing on the control input terminals THRU and ONE to output a selected one from the output terminal OUT. The truth Table for the selector SL is shown in FIG. 12(b). When signals on the control inputs THRU and ONE both represent logical "0", data Q latched is outputted from the output terminal OUT. When signals on the control inputs THRU and ONE represent logical "1" and "0" respectively, a signal IN input to the input terminal IN is outputted from the output terminal OUT as it is. When a signal on the control input ONE shifts to logical "1", data of logical "0" is always outputted from the output terminal OUT.

In the ordinary computational mode, it is sufficient to make settings such that signals on THRU and ONE of the control inputs 151 and 152 for the registers 101 and 102 both represent logical "0", and signals on THRU and ZERO of the control inputs 153 and 155 for the registers 103 and 105 both represent "0", thus allowing data Q held in the flip-flop FF to be outputted from the output terminal OUT.

Then, the operation of the data transfer mode will be described. For instance, in the case of writing data inputted from the data bus 121 into the register 105, its operation will be performed as follows. Settings are made such that signals on THRU and ONE of the control inputs for the register 101 represent logical "1" and "0", respectively, a signal on ONE of the control input for the register 102 represents logical "1", a signal on ZERO of the control input for the register 103 represents logical "1", and a signal on LATCH of the control input for the register represents logical "1". In addition, addition is instructed to the ALU 113 through the control input 163. Thus, data on the data bus 121 is outputted from the register 101 to the data bus 125 at it is. Similarly, data of logical "0" are output from the registers 102 and 103 to the data buses 126 and 127, respectively. Accordingly, data on the data bus 125 is output from the MPY 211 to the data bus 129. Since data of logical "0" has been output to the data bus 127, data on the data bus 129 is output from the ALU 113 to the data bus 132. The data thus output is latched in the register 105. After all, the data which has been input to the data bus 121 is written into the register 105 via the register 101, the MPY 211 and the ALU 113. In connection with other cases, by varying control inputs for respective registers, it is possible to read the content of a certain register or write data into a certain register.

Actual examples of circuits shown in FIGS. 11 and 12 are shown in FIGS. 13(a) and 14(a) respectively. The circuit shown in FIG. 13(a) has the same configuration as the circuit shown in FIG. 7. The former differs from the latter only in that a control input terminal labeled ONE is used instead of the control input terminal labeled ZERO.

The circuit shown in FIG. 14(a) has an arrangement nearly identical to the circuit shown in FIG. 13(a), but differs from the latter in that a p-channel MOS transistor $Q_{p4}$ is provided instead of the n-channel MOS transistor $Q_{n6}$, the p-channel MOS transistor $Q_{p4}$ being inserted between the output terminal OUT and a power supply $V_{DD}$. The gate of this transistor $Q_{p4}$ is connected to the control input terminal ONE through an inverter $INV_4$.

When signals on the control input terminals both represent L level, the transistors $Q_{n3}$ and $Q_{p4}$ are cut off and the transistors $Q_{p1}$ and $Q_{p2}$ are turned on. Thus an output Q of the flip-flop constituted with the inverters $INV_2$ and $INV_3$ is outputted from the output terminal OUT. When signals on the control input terminals THRU and ONE represent H and L levels, respectively, the transistors $Q_{n3}$ and $Q_{p2}$ are turned on and the transistors $Q_{p1}$ and $Q_{p4}$ are cut off. Thus, a signal appearing on the input terminal IN is outpulled from the output terminal OUT as it is. When signals on the control inputs THRU and ONE represent L and H levels, the transistors $Q_{n3}$ and $Q_{p2}$ are cut off and the transistors $Q_{p1}$ and $Q_{p4}$ are turned on. Thus, a signal of logical "1" is outputted from the output terminal OUT. In addition, when signals on the control input terminals THRU and ONE both represent H level, an output of signal is disabled.

In the above-mentioned embodiments, the function of passing data are given to not only the register for holding data to be computationally processed but also the register for holding the computationally processed result. However, data pass function may be given only to either of these registers. Moreover, data pass function may be given only to the computational means, e.g., ALU or MPY, etc.

In addition, while it has been described in the above-mentioned embodiments that ALU or MPY is actually used as the computational means, the present invention may be applied to circuits including ROM, RAM or PAL or combinational circuits, thus allowing them to have the data pass function.

What is claimed is:

1. A logic circuit including an input register having storage elements for storing input data, a computation circuit for computationally processing data supplied from said input register and an output register having storage elements for storing output data of said computation circuit wherein said input register stores input data as first data, said computation circuit processes said first data supplied from said input register and outputs second data which is a computationally processed result when said computation circuit is placed in a normal mode designated by a control signal, said output register stores said second data supplied from said computation circuit as third data and outputs said third data when said output register is placed in a normal mode designated by a control signal; and wherein said logic circuit comprises:
   input data bypass means, provided in said input register, for passing said input data as input bypass data without storage thereof in said storage elements of said input register and without modifying said input data when said input data bypass means is placed in a test mode by a control signal received by said input data bypass means;
   computation data pass means, connected to said computation circuit, for passing said input bypass data without modification thereof as computational pass data when said computational data pass means is placed in a test mode by a control signal received by said computational data pass means; and
   output data bypass means, provided in said output register, receiving said computational pass data for passing said computational pass data as output bypass data without storage thereof in said storage elements of said output register and without modifying said output bypass data when said output data bypass means is placed in a test mode by a control signal received by said output data bypass means.

2. A logic circuit as set forth in claim 1, wherein said computation is provided with two input ports to computationally process data inputted from said input ports, said input register being provided at each of said input ports.

3. A logic circuit as set forth in claim 1, wherein said computation data pass means includes a plurality of data pass circuits, each of said plurality of data pass circuits comprising:
   a first n-channel MOS transistor into which said first data is input from said input register and a first control input is input through a gate electrode of said first transistor,
   a second n-channel MOS transistor connected in parallel between an output terminal and ground, and
   a first inverter connected between said gate of said first transistor and a gate electrode of said second transistor.

4. A logic circuit as set forth in claim 3, wherein said input data bypass means and said output data bypass means each includes a plurality of data bypass circuits, each of said data bypass circuits comprising:
   a third n-channel MOS transistor into which data is fed through an input terminal,
   a fourth n-channel MOS transistor into which data to be stored is input through a source electrode and a second control input is input through a gate electrode,
   second and third inverters connected in series to a drain electrode of said fourth transistor,
   a fifth transistor connected between said third inverter at a source electrode and an output terminal at a drain electrode, and
   a fourth inverter into which is input a third control input and which outputs an inversion output to a gate electrode of said fifth transistor.

5. A logic circuit as set forth in claim 1, wherein said input data bypass means and said output data bypass means which includes a plurality of data bypass circuits, each of said data bypass circuits comprising:
   a flip-flop into which is input data and a first control input, and
   a selector which is supplied with a signal appearing with data, an output of said flip-flop and a signal corresponding to ground or a reference voltage in order to select data or the output of said flip-flop on the basis of second and third control inputs.

6. A logic circuit as set forth in claim 5, wherein said flip-flop comprises a first n-channel MOS transistor into which data is inputted, a second n-channel MOS transistor into which the first control input is input through its gate, and first and second inverters connected in series to a drain electrode of said second n-channel MOS transistor;
   wherein said selector comprises a first p-channel MOS transistor connected to said second inverter at its source electrode and into which is input the second control input at its gate electrode, a second p-channel MOS transistor connected to a drain electrode of said first p-channel MOS transistor at its source electrode and into which is input the third control input at its gate, and a third n-channel MOS transistor into which is input said third control input at its gate and is connected to a connecting point between a drain electrode of said second p-channel MOS transistor and an output terminal at its source.

7. A logic circuit as set forth in claim 5, wherein said flip-flop comprises a first n-channel MOS transistor into which is input data, a second n-channel MOS transistor into which is inputted the first control input through its gate, and first and second inverters which are connected in series to a drain electrode of said second n-channel MOS transistor;

wherein said selector comprises a first p-channel MOS transistor connected to said second inverter at its source electrode and into which is input the second control input at its gate electrode, a second p-channel MOS transistor connected to a drain electrode of said first p-channel MOS transistor at its source electrode and into which is input the third control input at its gate, and a third inverter connected to a gate of said second p-channel MOS transistor, and a third p-channel MOS transistor which is connected to said third inverter at its gate electrode and which is connected to an output terminal at its drain electrode.

8. A logic circuit as set forth in claim 1, wherein said computation circuit having said computation data pass means, is configured as an arithmetic logic unit or a multiplier.

9. A logic circuit as set forth in claim 1, wherein said control signals designate either a normal mode or a test mode, and wherein said output data bypass means pass data when said test mode is designated.

* * * * *